US009201752B2

(12) United States Patent
MacDonald et al.

(10) Patent No.: US 9,201,752 B2
(45) Date of Patent: Dec. 1, 2015

(54) SYSTEM AND METHOD FOR CORRELATING EMPIRICAL DATA WITH USER EXPERIENCE

(75) Inventors: Wilson T. MacDonald, Holliston, MA (US); Joel D. Kaufman, Rindge, NH (US); Daniel L. Holmes, Madbury, NH (US); Kathleen A. Hickey, Ashland, MA (US)

(73) Assignee: CA, Inc., New York, NY (US)

( * ) Notice: Subject to any disclaimer, the term of this patent is extended or adjusted under 35 U.S.C. 154(b) by 402 days.

(21) Appl. No.: 12/689,609

(22) Filed: Jan. 19, 2010

(65) Prior Publication Data

US 2011/0179313 A1     Jul. 21, 2011

(51) Int. Cl.
*G06F 11/30*     (2006.01)
*G06F 11/34*     (2006.01)
*H04L 12/24*     (2006.01)

(52) U.S. Cl.
CPC ........ *G06F 11/3058* (2013.01); *G06F 11/3006* (2013.01); *H04L 41/5016* (2013.01); *H04L 41/5067* (2013.01); *G06F 11/3409* (2013.01); *G06F 11/3495* (2013.01); *H04L 41/0213* (2013.01); *H04L 41/046* (2013.01); *H04L 41/147* (2013.01)

(58) Field of Classification Search
CPC . H04L 41/5003; H04L 41/5009; H04L 65/80; H04L 41/147; H04L 45/3065; H04L 43/08; H04L 12/2602; H04L 41/5067; G06F 11/3058; G06F 11/3409; G06F 11/3447; G06F 17/30306; H04M 3/2227; H04M 7/0084
USPC ............... 714/46, 47.1, 57; 719/318; 370/242
See application file for complete search history.

(56) References Cited

U.S. PATENT DOCUMENTS

| | | | |
|---|---|---|---|
| 5,825,645 A * | 10/1998 | Konar et al. ................... 700/28 |
| 7,212,498 B2 * | 5/2007 | Austin et al. .................. 370/252 |
| 7,296,288 B1 * | 11/2007 | Hill et al. ........................ 726/2 |
| 7,328,262 B2 * | 2/2008 | McDonagh et al. .......... 709/224 |
| 7,725,570 B1 * | 5/2010 | Lewis ........................... 709/224 |
| 7,979,031 B2 * | 7/2011 | Tatman et al. ............. 455/67.11 |
| 8,121,055 B2 * | 2/2012 | Briand et al. ................. 370/255 |
| 8,587,630 B1 * | 11/2013 | Krinsky et al. ............ 348/14.02 |
| 2001/0001156 A1 * | 5/2001 | Leppek ......................... 713/201 |
| 2001/0027484 A1 * | 10/2001 | Nishi ............................ 709/223 |
| 2003/0099205 A1 * | 5/2003 | Lee et al. ...................... 370/252 |
| 2003/0148755 A1 * | 8/2003 | Bovo et al. ................... 455/414 |
| 2004/0078733 A1 * | 4/2004 | Lewis ............................. 714/57 |
| 2004/0103193 A1 * | 5/2004 | Pandya et al. ................. 709/224 |

(Continued)

FOREIGN PATENT DOCUMENTS

WO    WO 2009126997 A1 * 10/2009 ............. G06F 19/00

*Primary Examiner* — Loan L. T. Truong
(74) *Attorney, Agent, or Firm* — Baker Botts L.L.P.

(57) ABSTRACT

A method includes receiving at a computing system empirical data related to one or more information technology entities. The method further includes receiving at the computing system one or more user experience indicators, the user experience indicators indicative of a user's experience using a computer application. The method further includes correlating by the computing system the empirical data with the one or more user experience indicators to determine a quality of service delivered to a user for a plurality of time periods. The method further includes determining by the computing system, based on the correlation, whether one or more issues with one of the one or more information technology entities are related to the quality of service delivered to the user.

19 Claims, 2 Drawing Sheets

(56) References Cited

U.S. PATENT DOCUMENTS

| | | |
|---|---|---|
| 2004/0218604 A1* | 11/2004 | Porter .................. 370/395.2 |
| 2004/0252027 A1* | 12/2004 | Torkkola et al. ............. 340/576 |
| 2005/0001763 A1* | 1/2005 | Han et al. ................ 342/357.04 |
| 2005/0091378 A1* | 4/2005 | Nonnenmacher ............ 709/227 |
| 2005/0135267 A1* | 6/2005 | Galbraith et al. ............ 370/252 |
| 2005/0144188 A1* | 6/2005 | Bailey et al. ................ 707/101 |
| 2005/0183034 A1* | 8/2005 | Chitsaz et al. ............... 715/810 |
| 2005/0276230 A1* | 12/2005 | Akahane et al. ............ 370/252 |
| 2006/0045050 A1* | 3/2006 | Floros et al. ................ 370/332 |
| 2006/0072476 A1* | 4/2006 | Sirivara et al. ............... 370/252 |
| 2006/0203722 A1* | 9/2006 | Oommen .................... 370/229 |
| 2007/0041330 A1* | 2/2007 | Bostica et al. ............... 370/252 |
| 2007/0263506 A1* | 11/2007 | Gulas et al. ................ 369/47.53 |
| 2007/0299803 A1* | 12/2007 | Emuchay et al. ............... 707/1 |
| 2008/0004035 A1* | 1/2008 | Atkins et al. ................ 455/454 |
| 2008/0008093 A1* | 1/2008 | Wang et al. ................. 370/235 |
| 2008/0027680 A1* | 1/2008 | Garzia et al. ............... 702/182 |
| 2008/0049632 A1* | 2/2008 | Ray et al. ................... 370/250 |
| 2008/0049757 A1* | 2/2008 | Bugenhagen ............ 370/395.1 |
| 2008/0052394 A1* | 2/2008 | Bugenhagen et al. ........ 709/224 |
| 2008/0052628 A1* | 2/2008 | Bugenhagen et al. ........ 715/736 |
| 2008/0113622 A1* | 5/2008 | Lee et al. ...................... 455/62 |
| 2008/0123660 A1* | 5/2008 | Sammour et al. ........ 370/395.21 |
| 2008/0205267 A1* | 8/2008 | El Barachi et al. ........... 370/230 |
| 2008/0214186 A1* | 9/2008 | Bizzarri et al. ............... 455/425 |
| 2009/0029645 A1* | 1/2009 | Leroudier ........................ 455/7 |
| 2009/0077016 A1* | 3/2009 | Belknap et al. .................. 707/2 |
| 2009/0157880 A1* | 6/2009 | Lee et al. ..................... 709/226 |
| 2009/0175279 A1* | 7/2009 | Gao et al. ................ 370/395.21 |
| 2009/0225762 A1* | 9/2009 | Davidson et al. ............. 370/401 |
| 2009/0227251 A1* | 9/2009 | Lei et al. ...................... 455/425 |
| 2009/0288152 A1* | 11/2009 | Huber et al. ..................... 726/6 |
| 2009/0327562 A1* | 12/2009 | Bellows et al. ............... 710/305 |
| 2010/0020681 A1* | 1/2010 | Nakashima et al. .......... 370/229 |
| 2010/0054134 A1* | 3/2010 | Briand et al. ................ 370/241 |
| 2010/0070981 A1* | 3/2010 | Hadar et al. ................. 719/318 |
| 2010/0138565 A1* | 6/2010 | Brisebois ....................... 710/18 |
| 2010/0199318 A1* | 8/2010 | Chang et al. ................... 725/97 |
| 2010/0290610 A1* | 11/2010 | Gore ......................... 379/142.15 |
| 2011/0019584 A1* | 1/2011 | Raghavendran et al. ..... 370/254 |
| 2011/0126154 A1* | 5/2011 | Boehler et al. ............... 715/811 |

\* cited by examiner

SYSTEM AND METHOD FOR CORRELATING EMPIRICAL DATA WITH USER EXPERIENCE

TECHNICAL FIELD

The present disclosure relates generally to information technology and more particularly to a system and method for correlating empirical data with user experience.

BACKGROUND

Information technology systems provide services to users of computing systems. Such services may include email services, communication services, accounting services, and any other service used in the line of business. Typical equipment used to provide such services may include devices such as application servers, web servers, databases, and network devices. Traditionally, equipment used to provide information technology services has been monitored based on empirical data such as resource utilization. Traditional monitoring techniques, however, are inadequate and do not provide a complete picture of the quality of service being provided to the users of the services.

SUMMARY

According to one embodiment of the present invention, a method includes receiving at a computing system empirical data related to one or more information technology entities. The method further includes receiving at the computing system one or more user experience indicators, the user experience indicators indicative of a user's experience using a computer application. The method further includes correlating by the computing system the empirical data with the one or more user experience indicators to determine a quality of service delivered to a user for a plurality of time periods. The method further includes determining by the computing system, based on the correlation, whether one or more issues with one of the one or more information technology entities are related to the quality of service delivered to the user.

Certain embodiments of the disclosure may provide one or more technical advantages. A technical advantage of one embodiment may be that issues in IT infrastructure that affect user experience may be identified. A technical advantage of another embodiment may be that the system may determine whether or not an issue in IT infrastructure impacts user experience.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Figure 1:
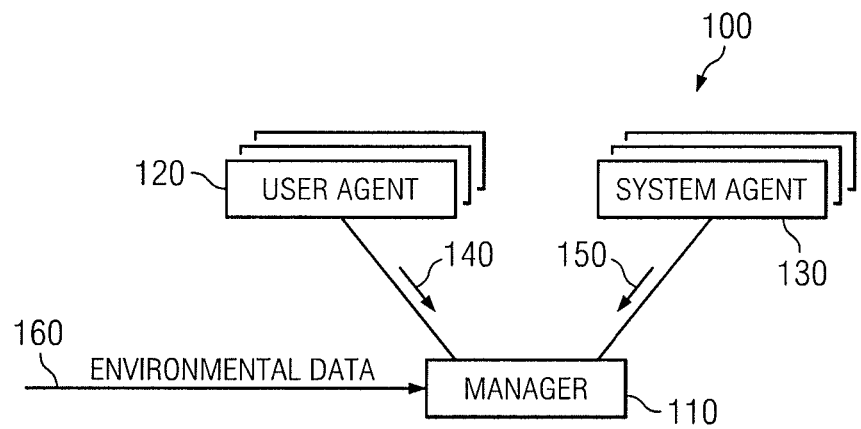
FIG. 1 is a block diagram illustrating one embodiment of a system for correlating empirical data with user experience.
Figure 3:
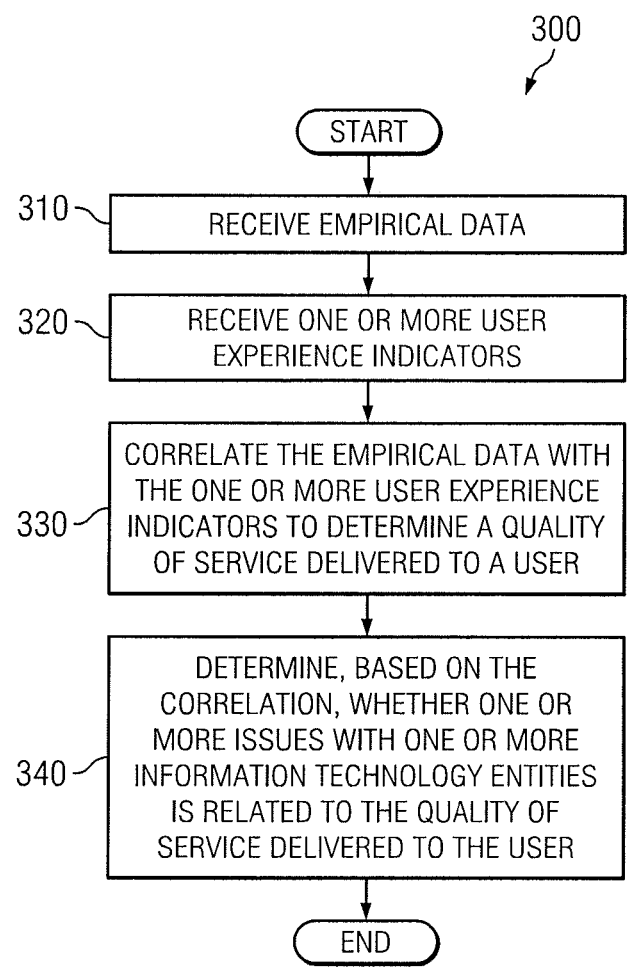
FIG. 3 illustrates one embodiment of a method for correlating empirical data with user experience.
Figure 2:
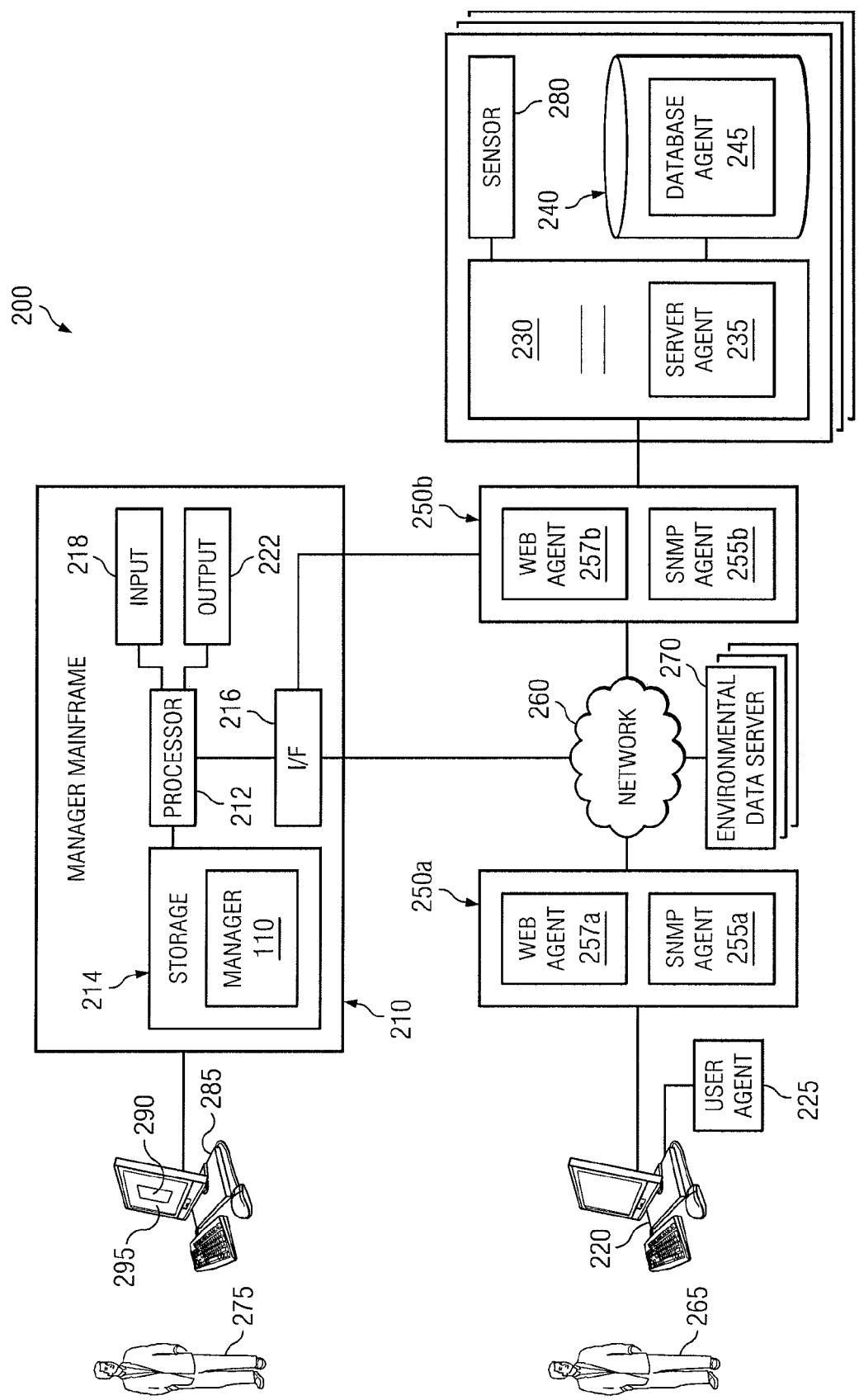
FIG. 2 is a block diagram illustrating another embodiment of a system for correlating empirical data with user experience.

Embodiments of the present invention and its advantages are best understood by referring to FIGS. 1 through 3 of the drawings, like numerals being used for like and corresponding parts of the various drawings.

Information technology (IT) departments are typically tasked with providing users with computing services such as email, business applications, communications services, and any other computer-related services. To provide these services, IT departments typically utilize, and are responsible for, various computing, networking, and communications devices. As a result, many IT departments have a need for monitoring and analyzing the performance of the infrastructure used to deliver the IT services.

Often times, IT departments utilize empirical data such as resource utilization to estimate the quality of service being delivered to its users. However, typical methods of estimating the quality of delivered services are inadequate and do not provide an easy way to ascertain whether or not the service is performing adequately for the needs of the business. In addition, typical methods of estimating the quality of delivered services do not provide an automated way to correlate empirical data with the quality of service being delivered in order to identify problems in the IT infrastructure.

The teachings of the disclosure recognize that it would be desirable to provide a correlation of empirical data with the quality of service being delivered to users in order to identify problems in the IT infrastructure. FIGS. 1 through 3 below illustrate a system and method of correlating empirical data with the quality of service being delivered to users according to the teachings of the disclosure.

FIG. 1 illustrates an embodiment of a system 100 that may be used to provide a correlation of empirical data with the quality of service being delivered to users. In certain embodiments, system 100 includes a manager 110, one or more user agents 120, and one or more system agents 130. The components of system 100 may be coupled to each other in any suitable manner, including directly coupled as illustrated and/or coupled via other devices not specifically shown in FIG. 1.

In operation, manager 110 may correlate empirical data with user experience based on data received from user agents 120, data received from system agents 130, and/or received environmental data 160. In one embodiment, for example, empirical data may refer to one or more system performance indicators 150 received at manager 110 from system agents 130. System performance indicators 150 may, for example, indicate a level of activity and/or fault information at a particular time on an IT managed device or system. In addition, manager 110 may also receive one or more user experience indicators 140 from user agents 120. User experience indicators 140 may indicate, for example, a user's experience using an IT service at a particular time. Manager 110 may then correlate system performance indicators 150 with user experience indicators 140 to determine whether or not the degradation of an IT system or component in an IT system impacts the performance of the IT services provided to the user. As a result, system 100 may provide a better picture of the quality of service being provided to users as well as issues that may impact user's experience.

In another embodiment, manager 110 may correlate empirical data such as environmental data 160 with user experience indicators 140 to determine whether or not environmental conditions impact the performance of the IT services provided to the user. For example, manager 110 may receive environmental data 160 from sources such as environment sensors (not shown in FIG. 1) and/or environmental data servers (not shown in FIG. 1.) Environmental data 160 may, for example, indicate environmental conditions such as temperature at the location of an IT system at a particular time. In addition, manager 110 may also receive one or more user experience indicators 140 from user agents 120 as described above. Manager 110 may then correlate user experience indicators 140 with environmental data 160 to determine the effect of environmental conditions on the performance of the IT services provided to the user. As a result, system 100 may provide a better picture of the impact of environmental conditions on managed IT systems.

FIG. 2 illustrates an embodiment of a system 200 which may provide a correlation of empirical data with a user's experience. In certain embodiments, system 200 includes manager mainframe 210, user computer 220, IT entities 230, databases 240, network devices 250, user 265, environmental data servers 270, administrator 275, environmental sensors 280, and administrator workstation 285. In certain embodiments, manager mainframe 210, network devices 250, and environmental data servers 270 are communicatively coupled via network 260, while user computer 220 and IT entities 230 are coupled to network 260 via network devices 250. In certain embodiments, manager mainframe 210 is additionally and/or alternatively coupled directly to network device 250b. In certain embodiments, environmental sensors 280 and databases 240 are coupled to IT entities 230. In certain embodiments, the components of system 200 may be communicatively coupled to each other via other devices not specifically shown in FIG. 2.

In certain embodiments, user computer 220 may refer to any type of computing system typically utilized by a user 265. For example, user 220 may include a workstation, a personal computer such as a laptop, or any other device operable to process data. In certain embodiments, user computer 220 may execute any suitable operating system. For example, user computer 220 may execute IBM's zSeries/Operating System (z/OS), MS-DOS, PC-DOS, MAC-OS, WINDOWS, UNIX, OpenVMS, or any other appropriate operating systems, including future operating systems.

In certain embodiments, user computer 220 may include a user agent 225. User agent 225 may refer to logic in the form of a software application executed on user computer 220 and operable to provide data regarding user's 265 experience while using user computer 220 and/or a computer application running on user computer 220. For example, user agent 225 may be an embodiment of user agent 120 described above and may collect data regarding user's 265 experience using a computer application running on user computer 220 at a particular time. In certain embodiments, for example, user agent 225 may measure response times of an application running on user computer 220 in order to discern user's 265 experience. In another embodiment, user agent 225 may measure the timing inside a Java Virtual Machine in order to discern user's 265 experience. User agent 225 may then transmit the collected data to manager 110 of manager mainframe 210 as user experience indicators 140 described above. In certain embodiments, user agent 225 may refer to Computer Associate's Wily Customer Experience Manager™, Wily Introscope®, Insight™, eHealth® SystemEDGE™, NSM, or any other suitable agent operable to transmit data indicative of a user's 265 experience using user computer 220.

In certain embodiments, network device 250 may refer to any device operable to facilitate computer communications including, but not limited to, routers, switches, computer servers, and the like. In certain embodiments, network devices 250 include a web agent 257 and/or a Simple Network Management Protocol (SNMP) agent 255.

In certain embodiments, web agent 257 may refer to logic in the form of a software application that is operable to provide data regarding a user's experience while utilizing network devices 250. In certain embodiments, for example, user 265 may be accessing a web application on user computer 220. A web application may refer to a computer application being used by user 265 on user computer 220 but is actually being provided by another computer or server communicatively coupled to user computer 220 across network 260. Web agent 257a may refer to an embodiment of user agent 120 described above and may collect data regarding user's 265 experience using the web application on user computer 220 at a particular time. Web agent 257a may then transmit the collected data to manager 110 of manager mainframe 210 as user experience indicators 140 described above.

In certain embodiments, SNMP agent 255 may refer to logic in the form of a software application that is operable to provide fault and performance data for network devices 250. SNMP agent 255 may refer to an embodiment of system agents 130 described above and may collect data regarding the performance of network devices 250 and/or components contained in network devices 250. In certain embodiments, for example, network device 250a may include a processor (not shown) and SNMP agent 255a may collect data regarding the performance, integrity, and/or the utilization of the processor. SNMP agent 255a may then transmit the collected data to manager 110 of manager mainframe 210 as system performance indicators 150 described above.

In certain embodiments, IT entity 230 may refer to a computer, a computing system, an application server, or any other device utilized by an IT department to deliver IT services. In certain embodiments, IT entity 230 includes a server agent 235. In certain embodiments, server agent 235 may refer to logic in the form of a software application that is operable to provide fault and performance data for IT entity 230. Server agent 235 may refer to an embodiment of system agent 130 described above and may collect data regarding the performance of IT entity 230 and/or components contained in IT entity 230. In certain embodiments, for example, IT entity 230 may include a processor (not shown) and server agent 235 may collect data regarding the performance, integrity, and/or the utilization of the processor in IT entity 230. In another embodiment, IT entity 230a may include a storage device (not shown) and server agent 235 may collect data regarding the performance, integrity, and/or the utilization of the storage device in IT entity 230. Server agent 235 may then transmit the collected data to manager 110 of manager mainframe 210 as system performance indicators 150 described above.

In certain embodiments, database 240 may refer to any suitable database system. In certain embodiments, database 240 includes a database agent 245. In certain embodiments, database agent 245 may refer to logic in the form of a software application that is operable to provide fault and performance data for database 240. Database agent 245 may refer to an embodiment of system agents 130 described above and may collect data regarding the performance of database 240. In certain embodiments, for example, database agent 245 may collect data regarding the performance, integrity, and/or the utilization of database 240. Database agent 245 may then transmit the collected data to manager 110 of manager mainframe 210 as system performance indicators 150 described above.

In certain embodiments, environmental sensor 280 may refer to any sensor operable to detect environmental conditions. For example, environmental sensor 280 may be a temperature sensor that senses the temperature at the location of IT entity 230. Environmental sensor 280 may then transmit the collected data to manager 110 of manager mainframe 210 as environmental data 160 described above.

In certain embodiments, environmental data server 270 may refer to any server operable to provide environmental data. For example, environmental data server 270 may be a server that provides environmental conditions such as temperature, humidity, time of sunrise, time of sunset, and/or cloud conditions for particular locations. In one embodiment, for example, environmental data server 270 may be a web server operated by the National Weather Service. Environmental data server 270 may transmit the environmental conditions to manager 110 of manager mainframe 210 as environmental data 160 described above.

Manager mainframe 210 may refer to any suitable device operable to process data. For example, manager mainframe 210 may include a mainframe, server, host computer, workstation, web server, file server, a personal computer such as a laptop, or any other device operable to process data. In a further embodiment, manager mainframe 210 may execute any suitable operating system. For example, manager mainframe 210 may execute IBM's zSeries/Operating System (z/OS), MS-DOS, PC-DOS, MAC-OS, WINDOWS, UNIX, OpenVMS, or any other appropriate operating systems, including future operating systems.

In certain embodiments, manager mainframe 210 includes a processor 212, a storage device 214, a communication interface 216, an input device 218, and an output device 222. Processor 212 may refer to any suitable device operable to execute instructions and manipulate data to perform operations for manager mainframe 210. Processor 212 may include, for example, any type of central processing unit (CPU).

Storage device 214 may refer to any suitable device capable of storing and facilitating retrieval of data and/or instructions. Examples of storage device 214 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. In certain embodiments, storage device 214 may store manager 110 as logic for execution by processor 212.

Communication interface 216 (I/F) may refer to any suitable device operable to receive input for manager mainframe 210, send output from manager mainframe 210, perform suitable processing of the input or output or both, communicate to other devices, or any combination of the preceding. Communication interface 216 may include appropriate hardware (e.g. modem, network interface card, etc.) and software, including protocol conversion and data processing capabilities, to communicate through a LAN, WAN, or other communication system that allows manager mainframe 210 to communicate to other devices. Communication interface 216 may include any suitable software operable to access data from various devices such as user computer 220, network devices 250, environmental data servers 270, IT entities 230, environmental sensors 280, and databases 240. Communication interface 216 may also include any suitable software operable to transmit data to various devices such as user computer 220, network devices 250, environmental data servers 270, IT entities 230, environmental sensors 280, and databases 240. Communication interface 216 may include one or more ports, conversion software, or both.

Input device 218 may refer to any suitable device operable to input, select, and/or manipulate various data and information. Input device 138 may include, for example, a keyboard, mouse, graphics tablet, joystick, light pen, microphone, scanner, or other suitable input device. Output device 222 may refer to any suitable device operable for displaying information to a user. Output device 222 may include, for example, a video display, a printer, a plotter, or other suitable output device.

In certain embodiments, administrator workstation 285 may refer to any suitable computing system, workstation, personal computer such as a laptop, or any other device operable to process data. In certain embodiments, an administrator 275 may utilize administrator workstation 285 having a display 295 to view a report 290 generated by manager 110.

In certain embodiments, network 260 may refer to any interconnecting system capable of transmitting audio, video, signals, data, messages, or any combination of the preceding. Network 260 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof.

In operation, manager 110 may be logic encoded on a computer-readable medium such as storage device 214 and may be executed by processor 212 in order to correlate empirical data with a user's experience. For example, manager 110 may receive empirical data related to one or more IT entities 230, network devices 250, and/or databases 240. In certain embodiments, empirical data may refer to system performance indicators 150 received from SNMP agents 255, server agents 235, and/or database agents 245. In other embodiments, empirical data may refer to environmental data 160 received from environmental data servers 270 and/or environmental sensors 280 as described above. In addition, manager 110 may receive one or more user experience indicators 140 indicative of user's 265 experience using a computer application on user computer 220. In certain embodiments, manager 110 may receive user experience indicators 140 from user agents 225 and/or web agents 257. Manager 110 may then correlate the empirical data with the one or more user experience indicators 140 to determine a quality of service delivered to user 265 for a plurality of time periods. Manager 110 may then determine, based on the correlation, whether one or more issues with one or more IT entities 230, network devices 250, and/or databases 240 are related to the quality of service delivered to the user.

In certain embodiments, the received system performance indicators 150 may include fault information at a particular time for IT entity 230, network device 250, and/or database 240. For example, system performance indicators 150 may indicate the level of activity on IT entity 230 and/or an application running on IT entity 230. Additionally or alternatively, system performance indicators 150 may provide statistics for a particular component of IT entity 230, network device 250, and/or database 240. For example, system performance indicators 150 may provide the utilization of a processor of IT entity 230 (not illustrated) and/or the amount of free memory available to IT entity 230 at a particular time. Manager 110 may then determine whether a degradation of IT entity 230, network device 250, and/or database 240 affects the quality of service delivered to a user.

In certain embodiments, manager 110 may correlate system performance indicators 150 with the one or more user experience indicators 140 by utilizing time slicing. For example, manager 110 may analyze user experience indicators 140 and system performance indicators 150 and classify the indicators into one or more categories. In certain embodiments, for example, the categories may include a level of activity for IT entity 230, network device 250, and/or database 240 for a particular time period and a classification of the user's experience for the particular time period. For example, manager 110 may analyze user experience indicators 140 and system performance indicators 150 and classify the indicators into the following time categories:

1. Time of high activity and good service
2. Time of low activity and good service
3. Time of high activity and degraded service
4. Time of low activity and degraded service
5. Time of high activity and no service
6. Time of low activity and no service Manager 110 may then analyze system performance indicators 150 from IT entity 230, network device 250, and/or database 240. In certain embodiments, for example, manager 110 may analyze system performance indicators 150 using correlation math to determine if any IT device was degraded and/or reported any faults for a particular time when service to user 265 was degraded. In the above scenario, for example, manager 110 may determine whether IT entity 230, network device 250, and/or database 240 reported faults or were degraded during time periods 3-6. As a result, manager 110 may provide a more accurate picture of issues in the IT infrastructure that directly impact user experience.

In certain embodiments, the empirical data may alternatively or additionally include environmental data 160 from environmental data server 270 and/or environmental sensor 280. Environmental data 160 may provide information on environmental conditions at the location of IT entities 230, network devices 250, and/or databases 240. For example, environmental data 160 may indicate temperature, humidity, time of sunrise, time of sunset, and/or cloud conditions for particular locations as described above. Manager 110 may then determine whether a particular environmental condition at the location of IT entities 230, network devices 250, and/or databases 240 affects the quality of service delivered to a user. For example, manager 110 may analyze user experience indicators 140 and environmental data 160 and classify the information into the following categories:

1. Time of low temperature and good service
2. Time of high temperature and good service
3. Time of low temperature and degraded service
4. Time of high temperature and degraded service
5. Time of low temperature and no service
6. Time of high temperature and no service Manager 110 may then analyze system performance indicators 150 from IT entity 230, network device 250, and/or database 240. In certain embodiments, for example, manager 110 may analyze system performance indicators 150 using correlation math to determine if any IT device was degraded and/or reported any faults for a particular time when service to user 265 was degraded. In the above scenario, for example, manager 110 may determine whether IT entity 230, network device 250, and/or database 240 reported faults or were degraded during time periods 3-6. As a result, manager 110 may provide a more accurate picture of issues in the IT infrastructure that directly impact user experience as they are related to environmental conditions.

In certain embodiments, manager 110 may provide a report 290. In certain embodiments, report 290 may include various time periods and a list of one or more issues that have been determined to affect the quality of service delivered to a user for the various time periods. For example, report 290 may provide a list of issues and/or system performance indicators 150 that have been determined to impact user experience. Additionally or alternatively, report 290 may provide a list of environmental conditions that have been determined to impact user experience. As a result, IT personnel such as administrator 275 may be able to prioritize investment decisions regarding the IT infrastructure.

In certain embodiments, manager 110 may utilize historical baseline data and trend analysis to anticipate capacity issues prior to service degradation. For example, manager 110 may analyze the time slices described above over time to determine a predicted time when service to user 265 will be degraded. In certain embodiments, manager 110 may include capacity issue predictions and/or service degradation predictions in report 290. As a result, manager 110 provides an early warning for future capacity and service degradation issues.

FIG. 4 illustrates one embodiment of a method 300 for correlating empirical data with user experience. Method 300 begins at step 310. At step 310, empirical data related to one or more information technology entities is received. In certain embodiments, the received empirical data includes system performance indicators 150 as described above. In certain embodiments, the received empirical data includes environmental data 160 as described above.

At step 320, one or more user experience indicators are received. In certain embodiments, the user experience indicators are indicative of a user's experience using a computer application. In certain embodiments, the user experience indicators received in step 320 user experience indicators 140 described above.

At step 330, the empirical data received in step 310 is correlated with the one or more user experience indicators received in step 330 to determine a quality of service delivered to a user for a plurality of time periods. In certain embodiments, the correlation of step 330 is performed similarly to the correlation performed by manager 110 described above.

At step 340, method 300 determines, based on the correlation of step 330, whether one or more issues with one of the one or more information technology entities are related to the quality of service delivered to the user. In certain embodiments, the determination of step 340 is performed similarly to the determination performed by manager 110 described above. At step 330, method 300 ends.

Modifications, additions, or omissions may be made to method 300 without departing from the scope of the disclosure. The steps of method 300 may be integrated or separated. Moreover, the steps of method 300 may be performed by more, fewer, or other components.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:
1. A method, comprising:
receiving at a computing system empirical data related to one or more information technology entities;

receiving at the computing system one or more user experience indicators from a user agent on a user's computer, the user experience indicators indicative of the user's experience using a computer application on the user's computer;

correlating by the computing system the empirical data with the one or more user experience indicators to determine a quality of service delivered to a user, the correlating comprising classifying the empirical data and the one or more user experience indicators into a plurality of time categories, each time category comprising:

a classification of the user's experience for a particular time period; and a classification of the empirical data for the particular time period, the classification of the empirical data for each time category selected from a plurality of categories indicating one or more of:

a level of activity for the one or more information technology entities; and a level of a particular environmental condition at the location of the one or more information technology entities; and determining by the computing system, based on the correlation, whether one or more issues with one of the one or more information technology entities are related to the quality of service delivered to the user.

2. The method of claim 1, wherein:

the empirical data comprises one or more system performance indicators, the system performance indicators comprising performance and fault information at a particular time for the one or more information technology entities; and the determining whether one or more issues with one of the one or more information technology entities is related to the quality of service delivered to the user comprises determining whether a degradation of one of the one or more information technology entities affects the quality of service delivered to a user.

3. The method of claim 1, wherein:

the empirical data comprises environmental data, the environmental data providing information on environmental conditions at the location of the one or more information technology entities; and the determining whether one or more issues with one of the one or more information technology entities is related to the quality of service delivered to the user comprises determining whether a particular environmental condition at the location of the one of the one or more information technology entities affects the quality of service delivered to a user.

4. The method of claim 1, further comprising providing a report, the report comprising:

a plurality of time periods; and a list of the one or more issues determined to affect the quality of service delivered to a user for the plurality of time periods.

5. The method of claim 1, wherein:

the one or more information technology entities comprise one or more application servers; and the computer application is provided by the one or more application servers.

6. The method of claim 2, further comprising:

determining that one or more of the one or more system performance indicators is associated with a degraded quality of service delivered to the user; and providing a list of the one or more of the one or more system performance indicators associated with the degraded quality of service delivered to the user.

7. A system, comprising:

a processor; and a program of instructions embodied on a computer-readable medium and operable, upon execution by the processor, to:

receive empirical data related to one or more information technology entities;

receive one or more user experience indicators from a user agent on a user's computer, the user experience indicators indicative of the user's experience using a computer application on the user's computer at a particular time;

correlate the empirical data with the one or more user experience indicators to determine a quality of service delivered to a user, the correlating comprising classifying the empirical data and the one or more user experience indicators into a plurality of time categories, each time category comprising:

a classification of the user's experience for a particular time period; and a classification of the empirical data for the particular time period, the classification of the empirical data for each time category selected from a plurality of categories indicating one or more of:

a level of activity for the one or more information technology entities; and a level of a particular environmental condition at the location of the one or more information technology entities; and;

determine, based on the correlation, whether one or more issues with one of the one or more information technology entities are related to the quality of service delivered to the user.

8. The method of claim 1, wherein the particular environmental condition at the location of the one or more information technology entities comprises one of temperature, humidity, sunlight, and cloud cover.

9. The system of claim 7, wherein:

the empirical data comprises one or more system performance indicators, the system performance indicators comprising performance and fault information at a particular time for the one or more information technology entities; and the determining whether one or more issues with one of the one or more information technology entities is related to the quality of service delivered to the user comprises determining whether a degradation of one of the one or more information technology entities affects the quality of service delivered to a user.

10. The system of claim 7, wherein:

the empirical data comprises environmental data, the environmental data providing information on environmental conditions at the location of the one or more information technology entities; and the determining whether one or more issues with one of the one or more information technology entities is related to the quality of service delivered to the user comprises determining whether a particular environmental condition at the location of the one of the one or more information technology entities affects the quality of service delivered to a user.

11. The system of claim 7, the program of instructions further operable, upon execution by the processor, to provide a report, the report comprising:

a plurality of time periods; and
a list of the one or more issues determined to affect the quality of service delivered to a user for the plurality of time periods.

12. The system of claim 7, wherein:
the one or more information technology entities comprise one or more application servers; and
the computer application is provided by the one or more application servers.

13. The system of claim 9, the program of instructions further operable, upon execution by the processor, to
determine that one or more of the one or more system performance indicators is associated with a degraded quality of service delivered to the user; and
provide a list of the one or more of the one or more system performance indicators associated with the degraded quality of service delivered to the user.

14. Logic encoded on a non-transitory computer-readable medium and operable, upon execution, to:
receive empirical data related to one or more information technology entities;
receive one or more user experience indicators from a user agent on a user's computer, the user experience indicators indicative of the user's experience using a computer application on the user's computer at a particular time;
correlate the empirical data with the one or more user experience indicators to determine a quality of service delivered to a user, the correlating comprising classifying the empirical data and the one or more user experience indicators into a plurality of time categories, each time category comprising:
a classification of the user's experience for a particular time period; and
a classification of the empirical data for the particular time period, the classification of the empirical data for each time category selected from a plurality of categories indicating one or more of:
a level of activity for the one or more information technology entities; and
a level of a particular environmental condition at the location of the one or more information technology entities; and;
determine, based on the correlation, whether one or more issues with one of the one or more information technology entities are related to the quality of service delivered to the user.

15. The logic of claim 14, wherein:
the empirical data comprises one or more system performance indicators, the system performance indicators comprising performance and fault information at a particular time for the one or more information technology entities; and
the determining whether one or more issues with one of the one or more information technology entities is related to the quality of service delivered to the user comprises determining whether a degradation of one of the one or more information technology entities affects the quality of service delivered to a user.

16. The logic of claim 14, wherein:
the empirical data comprises environmental data, the environmental data providing information on environmental conditions at the location of the one or more information technology entities; and
the determining whether one or more issues with one of the one or more information technology entities is related to the quality of service delivered to the user comprises determining whether a particular environmental condition at the location of the one of the one or more information technology entities affects the quality of service delivered to a user.

17. The logic of claim 14, the logic further operable, upon execution, to provide a report, the report comprising:
a plurality of time periods; and
a list of the one or more issues determined to affect the quality of service delivered to a user for the plurality of time periods.

18. The logic of claim 14, wherein:
the one or more information technology entities comprise one or more application servers; and
the computer application is provided by the one or more application servers.

19. The logic of claim 15, the logic further operable, upon execution, to:
determine that one or more of the one or more system performance indicators is associated with a degraded quality of service delivered to the user; and
provide a list of the one or more of the one or more system performance indicators associated with the degraded quality of service delivered to the user.

* * * * *